United States Patent
Lasslo et al.

(10) Patent No.: US 9,945,637 B1
(45) Date of Patent: Apr. 17, 2018

(54) SCOPE AND METHOD FOR SIGHTING-IN A FIREARM

(71) Applicants: Thomas J. Lasslo, Price, UT (US); Stephen J. P. Lasslo, De Pere, WI (US); Jeremiah J. Garcia, Price, UT (US); Curtis S. King, Kirkland, WA (US)

(72) Inventors: Thomas J. Lasslo, Price, UT (US); Stephen J. P. Lasslo, De Pere, WI (US); Jeremiah J. Garcia, Price, UT (US); Curtis S. King, Kirkland, WA (US)

( * ) Notice: Subject to any disclaimer, the term of this patent is extended or adjusted under 35 U.S.C. 154(b) by 40 days.

(21) Appl. No.: 14/872,545

(22) Filed: Oct. 1, 2015

Related U.S. Application Data

(60) Provisional application No. 62/058,930, filed on Oct. 2, 2014.

(51) Int. Cl.
| | | |
|---|---|---|
| F41G 1/35 | (2006.01) | |
| F41G 1/387 | (2006.01) | |
| F41G 1/34 | (2006.01) | |
| G02B 23/02 | (2006.01) | |
| G01C 3/02 | (2006.01) | |
| F41G 1/38 | (2006.01) | |
| H04N 5/33 | (2006.01) | |

(52) U.S. Cl.
CPC .............. *F41G 1/345* (2013.01); *G01C 3/02* (2013.01); *G02B 23/02* (2013.01); *F41G 1/38* (2013.01); *H04N 5/33* (2013.01)

(58) Field of Classification Search
CPC ..... F41G 1/38; F41G 1/12; F41G 1/44; F41G 3/08; F41G 3/02; F41G 3/06; F41G 1/473; G01S 17/42; G01S 17/026; G02B 23/02; G01C 3/02
See application file for complete search history.

(56) References Cited

U.S. PATENT DOCUMENTS

| | | | |
|---|---|---|---|
| 2,094,623 A | 10/1937 | Stokey | |
| 4,403,421 A | 9/1983 | Shepherd | |
| 4,965,439 A * | 10/1990 | Moore | F41G 3/06 235/404 |
| 7,516,571 B2 * | 4/2009 | Scrogin | F41G 1/38 42/114 |
| 7,624,528 B1 * | 12/2009 | Bell | F41G 1/38 42/115 |
| 8,468,930 B1 * | 6/2013 | Bell | F41G 11/001 342/67 |
| 8,695,266 B2 * | 4/2014 | Moore | F41G 1/44 356/249 |
| 2003/0192224 A1 * | 10/2003 | Kirk | F41G 11/002 42/124 |

(Continued)

*Primary Examiner* — Sang Nguyen
(74) *Attorney, Agent, or Firm* — Brian C. Trask

(57) ABSTRACT

A scope having a plurality of range-dependent, point-of-impact indicators (aim points), and methods for use of that scope. Such aim points are superimposed on the user's field of view of a conventional scope. A preferred embodiment may be coupled to a conventional scope. Embodiments include an auxiliary light projector that presents at least one aim point disposed in a user's field of view, and the aim point(s) is/are adjustable for elevation and windage. Aim points may also be adjusted in size, color, shape, and intensity.

21 Claims, 7 Drawing Sheets

(56) References Cited

U.S. PATENT DOCUMENTS

| | | | | |
|---|---|---|---|---|
| 2007/0282564 A1* | 12/2007 | Sprague | ............... | G03B 21/14 |
| | | | | 702/141 |
| 2013/0199074 A1* | 8/2013 | Paterson | ............... | F41G 3/06 |
| | | | | 42/122 |
| 2013/0283661 A1* | 10/2013 | Lynn | ............... | F41G 1/35 |
| | | | | 42/114 |
| 2016/0316128 A1* | 10/2016 | Teich | ............... | F41G 3/165 |

* cited by examiner

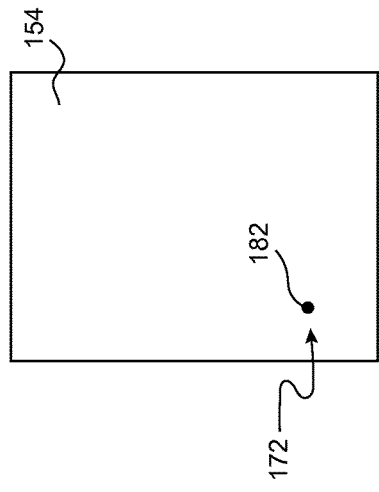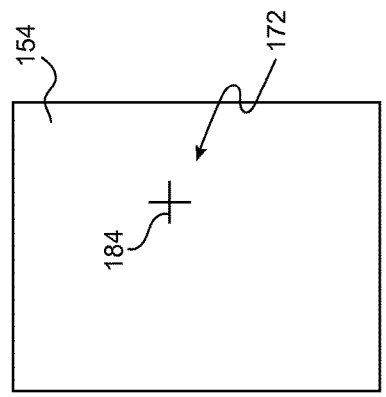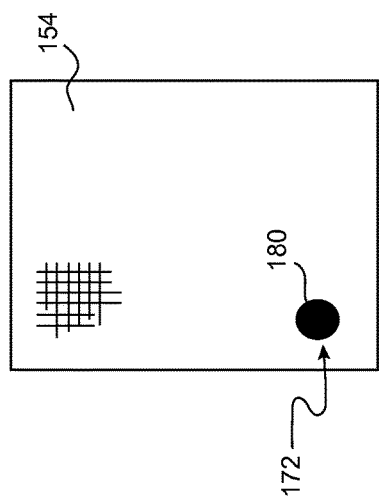

SCOPE AND METHOD FOR SIGHTING-IN A FIREARM

BACKGROUND

Related Applications:

This application claims the benefit under 35 U.S.C. 119(e) of the filing date of Provisional Patent Application Serial No. 62/058,930, filed Oct. 2, 2014, for "SIGHTING IN SYSTEM", the entire disclosure of which is hereby incorporated as though set forth herein in its entirety.

Field of the Invention:

This invention relates to optical devices that indicate point-of-impact for a projectile. It is particularly directed to a scope having a plurality of range-dependent point-of-impact indicators, and methods for use of that scope.

State of the Art:

Various sight systems structured to help the user of a firearm hit a target are well known. In general, so called "fixed", or "open", sights lack precision required for long-distance shooting. A plurality of optical sights have been developed to address that issue. One such optical sight is characterized as a telescopic sight, or "scope". Conventionally, open sights, and many scopes, are sighted-in to indicate one aim point corresponding to a target impact point at a single fixed distance. Although it may be possible for a user to make adjustments to the location of the sole aim point to correspond to a different distance to projectile impact, that process is typically cumbersome and time-consuming.

Scopes having a plurality of light-blocking reticules (or cross-hairs) are known. Exemplary disclosures of such devices are set forth in U.S. Pat. No. 2,094,623 to F. E. Stokey and U.S. Pat. No. 4,403,421 to Daniel R. Shepherd. A need exists for an improved sight system and methods to use that new sight system to advantage.

BRIEF SUMMARY OF THE INVENTION

This invention may be embodied to provide a scope having a plurality of range-dependent, point-of-impact indicators, and methods for use of that scope. Conventionally, the scope would be structured for use on a firearm, although alternative embodiments are workable.

A currently preferred embodiment may be characterized including or forming a target indicator, or sometimes an auxiliary target indicator. One such target indicator includes a housing structured to couple with an end of a substantially conventional firearm scope whereby to place a first optical axis of the housing in parallel with the optical axis of the scope upon assembly of the housing with the scope. A light projector and an electronics module are structurally and operably associated with the housing. A battery is disposed in operable electrical communication with the electronics module and light projector. The device also includes an optical system structured to cause propagation of light from the light projector in a direction substantially in agreement with the first optical axis and thereby to present a first aim point to the eye of a user. A user-operable control system is arranged effective to adjust the position of the first aim point in vertical and horizontal directions within the user's field of view when the user is looking through the scope.

A target indicator establishes at least one aim point, and is desirably structured to permit a user to adjust the aim point in intensity, size, color, and/or shape. A target indicator may be structured to provide a plurality of aim points to a user's eye, each of the plurality of aim points being separately adjustable to indicate one of a plurality of impact points, each of such impact points corresponding to a projectile landing at a known distance. An exemplary target indicator can sometimes also present other data to a user, including for non-limiting example, distance designation for one or more aim point. A workable target indicator can include a digital multi-pixel device.

A workable optical system may include one or more of: a prism; a focusing lens; and a light filtering element. One preferred optical system includes a beam splitter carried at a distal end of the housing and disposed in a plane having its normal oriented parallel to the first optical axis of the housing.

One exemplary device according to certain principles of the invention includes a housing structured to convey a target image along an optical axis to the eye of a user. A first lens is disposed at a distal end of the housing, and a second lens may be disposed at a proximal end of the housing. The device provides a plurality of aim points disposable for view by a user who is looking down the optical axis, each of the aim points being individually and separately user-adjustable in user-perceived vertical and horizontal directions, each of the aim points being attributable to a point-of-impact for a projectile at a designated distance from the apparatus. The device also includes a light projector associated with the housing. At least a first one of the aforementioned aim points is generated by the light projector. Sometimes, a second one of the aim points is defined by a light-blocking element, such as the cross-hair of a conventional firearm scope.

A workable light projector includes a multi-pixel screen. The device may include a battery disposed in operable electrical communication with an electronics module and with the light projector. A user-operable control system is coupled to the electronic module, and an optical system is structured to redirect a light output of the light projector for propagation in a direction generally in agreement with the optical axis for acquisition of a light output by the user's eye.

Desirably, the user-operable control system is structured to adjust a user-perceived display intensity of at least the first one of the aim points. Further, the user-operable control system may be structured to adjust a display color, shape, size, or location for an aim point.

A currently preferred embodiment of the invention includes a housing structured to convey a target image along an optical axis to the eye of a user. A first lens is disposed at a distal end of said housing, and a second lens may be disposed at a proximal end of the housing. A plurality of aim points are disposable for view by a user who is looking along the optical axis, each of the aim points being individually and separately user-adjustable in user-perceived vertical and horizontal directions, each of the aim points being attributable to a point-of-impact for a projectile at a designated distance from the embodiment. The housing is associated with a light projector including a multi-pixel screen. At least one of the aim points is generated by the light projector. Certain embodiments include a beam splitter disposed in association with the distal end of the housing.

BRIEF DESCRIPTION OF THE DRAWINGS

In the drawings, which illustrate what are currently considered to be the best modes for carrying out the invention:

FIGS. 4 through 7 are plan views of the emitter surface of an exemplary auxiliary light source;

DETAILED DESCRIPTION OF THE ILLUSTRATED EMBODIMENT(S)

Reference will now be made to the drawings in which the various elements of the illustrated embodiments will be given numerical designations and in which the invention will be discussed so as to enable one skilled in the art to make and use the invention. It is to be understood that the following description is only exemplary of certain principles of the present invention, and should not be viewed as narrowing the claims which follow.

For simplicity, the invention is generally described herein with reference to an add-on device that is used in combination with a conventional firearm scope. Other arrangements are workable. For example, it is within contemplation that the invention may be embodied as a unitary scope-type assembly.

Figure 1:
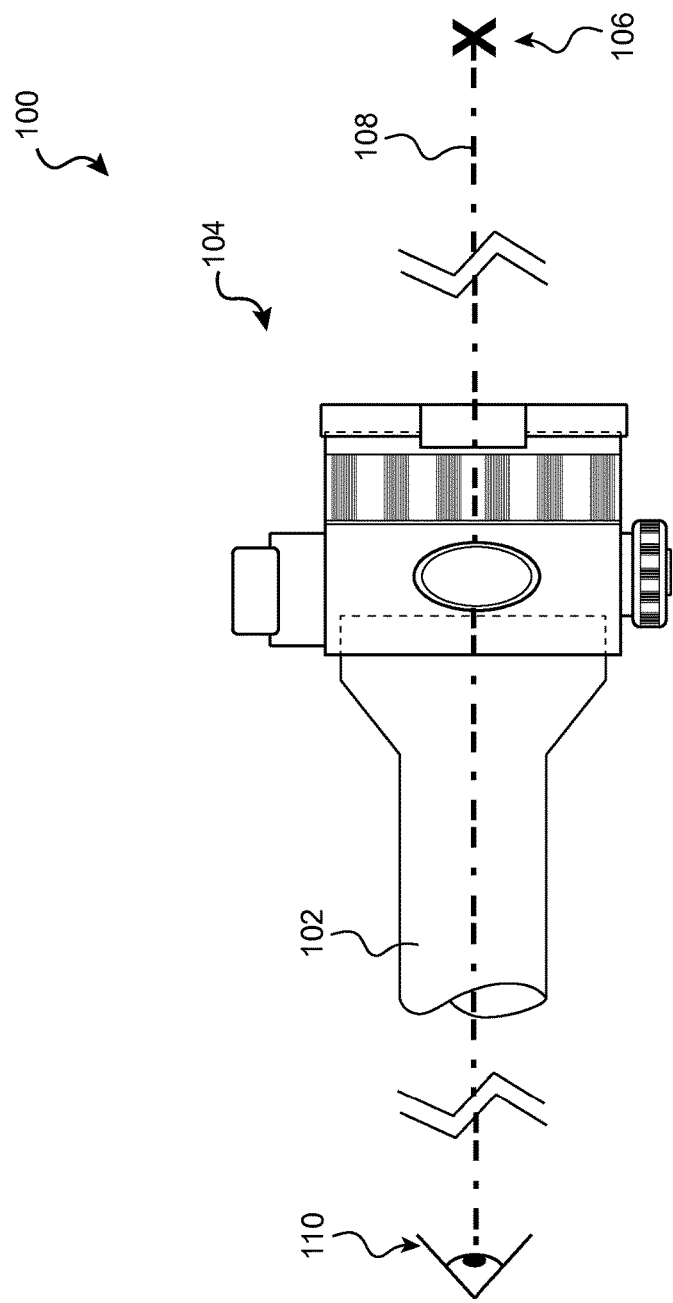
FIG. 1 is a side view of an embodiment structured according to certain principles of the invention.
Figure 2:
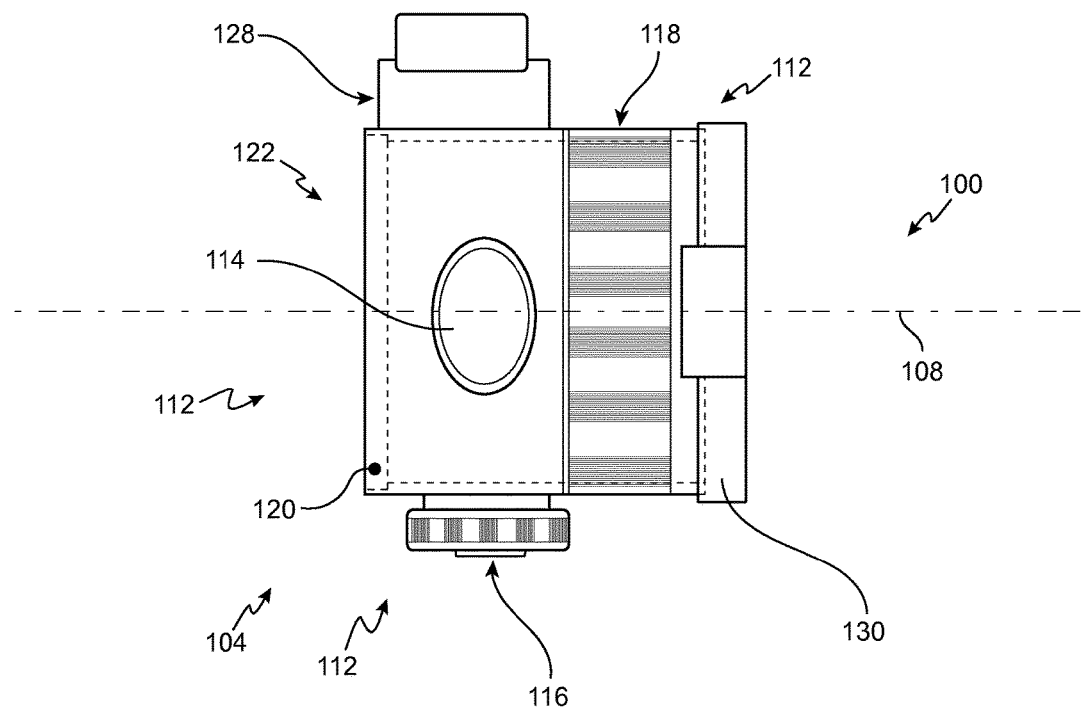
FIG. 2 is a side view of a portion of the device in FIG. 1.
Figure 3:
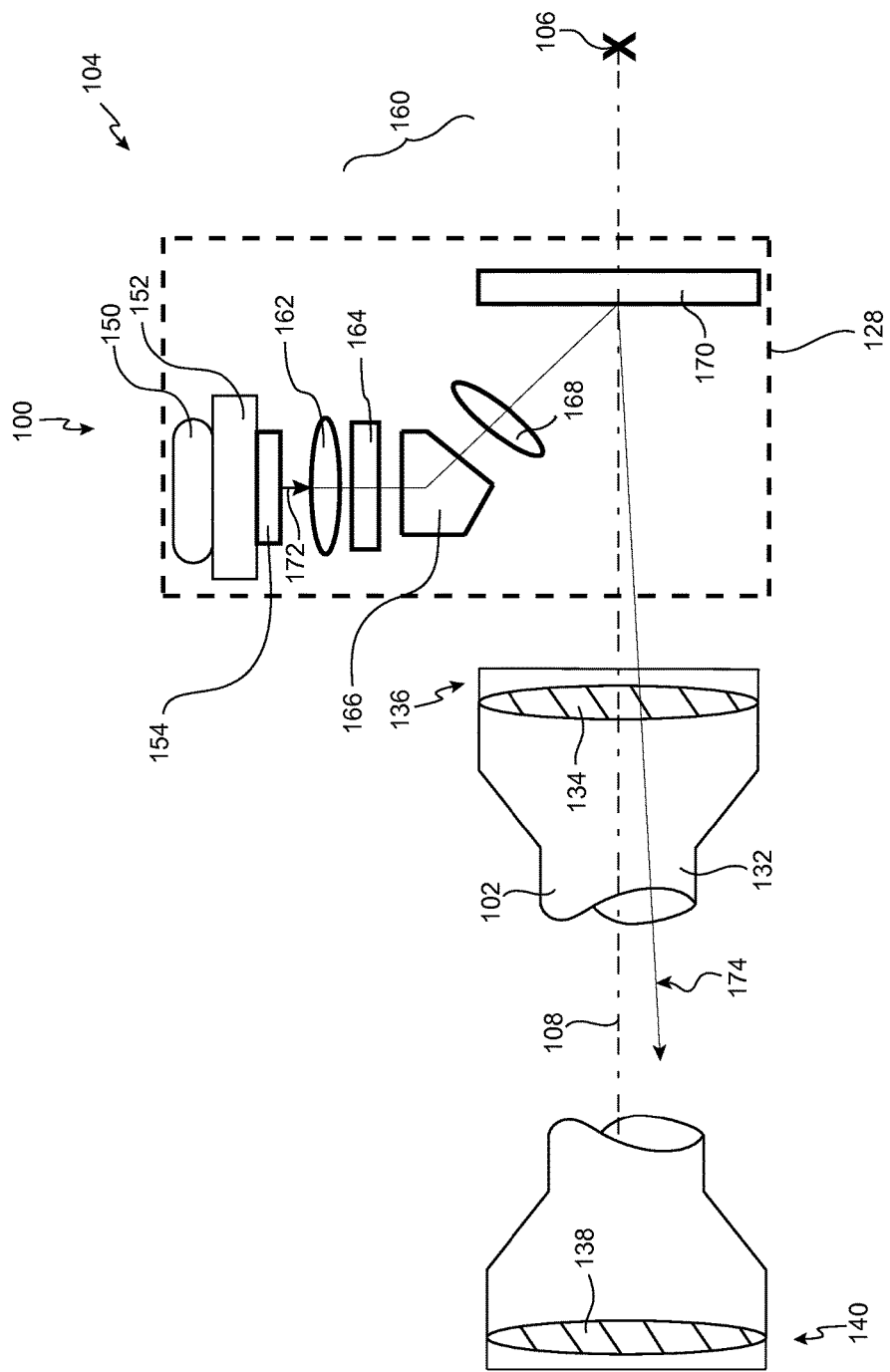
FIG. 3 is a side view partially exploded cartoon view of the device in FIG. 2

A first embodiment, generally 100, of an apparatus structured according to certain principles of the invention is illustrated in FIGS. 1 through 3. The apparatus 100 may be characterized as a scope capable of indicating multiple points-of-impact for a projectile, each point-of-impact being at a designated distance from the apparatus 100. An apparatus 100 may be made reference to as a telescopic sight, scope, sight-in device, optical sight, apparatus, embodiment, device, and the like. Embodiments 100 may, or may not, provide for magnification or a "close-up" view of the target. However, it is currently preferred for devices 100 to provide magnification of the target.

The exemplary apparatus 100 includes a conventional optical scope 102 and a cooperating auxiliary target indicator, generally 104. The scope 102 conveys the image of a target 106 along an optical axis 108 (the line-of-sight), to the eye of a user 110. A plurality of aim points may be provided by the apparatus 100 to a user. For example, a first aim point may indicate the impact point of a projectile at a first distance from the user. Second and subsequent aim points can be associated with impact locations for that projectile at corresponding second and subsequent distances. The apparatus 100 may also be structured to further account for changes in projectile (e.g., weight, shape, etc.) or environmental conditions (e.g., elevation, humidity, temperature, etc.), and indicate corresponding aim points for different distances.

A conventional scope 102 provides a first target aim point as a cross-hair arrangement that is a light-blocking element. That is, the cross-hairs block a portion of the light acquired by the scope from the area near to the target. In a typical arrangement, a single impact point at a fixed distance is indicated to a user's eye 110 by the intersection of the cross-hairs. The auxiliary target indicator 104 can provide additional aim points, as desired, which can individually indicate impact locations expected for a particular projectile at different distances from the user. Of course, under circumstances when there is no initial scope cross-hair arrangement or other aim point, the auxiliary target indicator 104 may provide all of the aim points to a user. For example, an alternative scope structure may not include a cross-hair arrangement, and all of the aim points may be established by target indicator 104. Also, target indicator 104 may be positioned at any operable location with respect to the scope, including attached to either of the proximal or distal scope ends, or even directly incorporated into the interior of the scope.

Aim points provided by the auxiliary target indicator 104 may be as simple as one or more dot, circle, line, or cross-hair. Aim points may be partially indicated by a portion of a cross-hair or post of a conventional scope 102. Aim points may be black-and-white, variously colored, color-coded, and/or associated with one or more symbol or alphanumeric designator. Desirably, the aim points are individually adjustable by the user in orthogonal directions (vertical and horizontal) to account for different target distances, wind speed, and the like. It is further desirable for aim points to be adjustable in intensity, size, and/or shape.

It is desirable to provide some sort of control mechanism, or mechanisms, generally 112, which is/are structured to permit a user to change a relative position, size, intensity, color, etc., of one or more aim point, and/or otherwise provide one or more input to control an apparatus 100. For non-limiting examples, and with particular reference to FIG. 2, an exemplary device 100 may include one or more push-button switch 114; and one or more rotary input device, such as first rotary switch 116 and second rotary switch 118. Alternative input mechanisms nonexclusively include various varieties of switches, including toggle, slider, digital, and the like; keypad, keyboard, touch screen, hand-held device, smart phone, and the like; and may include various coupling structures to external communication devices, including analog, digital, wireless, corded or dongle, combinations thereof, and the like.

It is desirable to provide user input controls in a compact format. For example, one or more multifunction input device, such as a combination push-button/rotary-dial input device, is within contemplation for use as an operable control mechanism. In one exemplary such control mechanism, a rotary dial may also be structured to be incrementally pulled-out, or pushed-in, to effect a control change. For example, rotary switch 116 may be pushed or pulled to toggle or index between different aim points, or other data. Then, rotary switch 116 can be rotated to change the position, size, intensity, color, etc., of the selected aim point or data.

With continued reference to FIG. 2, auxiliary target indicator 104 is structured to couple with the forward or distal portion of scope 102. The distal end of scope 102 (FIG. 1) is structured to couple with a socket 120 that is disposed in proximal end 122 of the device 104. Various coupling arrangements are operable, including slip-fit, bayonet, screw-on connection, and the like. A target indicator 104 may be maintained in workable registration with a scope 102 by adhesive, solder, friction, locking threads, or any other workable arrangement. Any arrangement operable to provide sufficiently accurate coupling can be used. When the target indicator 104 is removable, it is desirable for the coupling to be repeatable to maintain accuracy of aim point disposition upon reassembly.

Still with particular reference to FIG. 2, it is desirable to provide a compact indicator housing, generally 128, in which to protect certain elements of a target indicator 104. Such housing 128 may include various protuberances for particular elements, and switch mechanisms, and the like. In a preferred arrangement, a removable cover, such as flip-up (or flip-off) cover 130 is provided at the distal end of the housing 128. It is within contemplation for such a cover 130 to carry an element such as a beam splitter. One advantage provided in that arrangement is the ability to convert an augmented scope 100 to provide the optical properties of a conventional scope 102. For example, removing a beam splitter, or other sight augmenting element, from the line of sight may be advantageous under low-light conditions.

With reference now to FIG. 3, a conventional scope 102 includes a scope housing 132 that is structured to convey a target image along an optical axis to the eye of a user. A first lens 134 is disposed at a distal end, generally 136, of the scope housing 132. A second lens 138 is disposed at a proximal end, generally 140, of scope housing 132. Preferably, a target indicator 104 is structured to couple with the distal end 136 of scope housing 132. However, it is within contemplation that a housing 128 of target indicator 104 may be directly incorporated as a portion of a scope housing 132. Sometimes, a target indicator 104 may alternatively be coupled to the proximal end 140 of scope housing 132.

The target indicator 104 illustrated in FIG. 3 includes a power supply 150 operably connected to an electronics module 152 and a light projector 154. Preferably, the power supply 150 permits untethered operation of the device 100. A workable power supply 150 includes a battery. The electronics module 152 is structured to operate the device 100 in harmony with user inputs. User inputs may be made with the previously-described control mechanism(s), or by way of any other workable arrangement. An electronics module may include a computer processor or CPU, memory, and attendant chips and circuitry. Software (typically programmable) can be stored in the memory, along with user data input. A workable light projector 154 may include a conventional digital multi-pixel display module (such as LCD, CMOS, LCoS, OLED, etc.), or other emitter of light energy, such as a laser or LED. A light projector 154 is regarded as an auxiliary light source, because it represents a source of light in addition to ambient light that would conventionally enter the distal end 136 of scope 102.

An optical system, generally 160, is provided to direct an output from the light projector 154 substantially along the optical axis 108 and toward a user's eye. The output of light projector 154 is therefore added to the conventional image obtained by a scope 102 from ambient light. The illustrated optical system 160 includes a first lens 162, an optional filter 164, a redirect mechanism 166, a second lens 168, and a beam splitter 170. A workable beam splitter may be embodied as a flat lens, or may be otherwise structured (e.g. curved), to optimize optics. One or both of lens 162 and 168 may sometimes optionally be redacted, and additional lenses having various properties may be added, as appropriate. A workable redirect mechanism includes a prism (illustrated), and a mirror, or the like, which can change a direction of propagation of the visible radiant energy output 172 of a projector 154. An optical fiber would also be workable.

The optical system 160 functions in harmony with mechanical and electrical elements to precisely dispose a reflected image 174 for observation by a user of the device 100. The reflected image 174 defines aim points (and sometimes, other data such as distance to target, environmental information, including e.g., temperature, elevation, wind speed, and the like), and is added to, or superimposed onto, the conventional image obtained by the scope 102 by way of ambient light obtained from the area near to the target.

FIGS. 4 through 7 illustrate one operable arrangement effective to produce and manipulate an aim point, or other data, for perception by a user of a device 100. In these FIGs., light source 154 includes a digital multi-pixel display that is in communication with an electronics module 152 (e.g. see FIG. 3). In such devices 152, pixels are typically arranged in a rectangular X by Y array of discrete light-emitting elements. In FIG. 4, the light signal 172 projected by the projector 154 produces a large spot 180. Spot 180 may encompass, for example, about 1,000 pixels of display 154. In FIG. 5, light signal 172 has been modified by a user to project a smaller spot 182, which encompasses fewer pixels, say about 250. Spot size manipulation can be as simple for a user as rotating a dial to provide a workable input to the control module 152.

FIGS. 6 and 7 illustrate an alternative light signal 172 that forms a small cross-hair arrangement 184. Such an arrangement 184 may be defined by rows and columns of pixels of the display 154, with the "thickness" of the hairs being user definable from one pixel up to as many as desired. As illustrated in combination of FIGS. 6 and 7, it can be seen that a user can manipulate, or change, the location of an aim point 184 by instructing the projector 154 regarding which pixels to turn on. That is, in FIG. 6, the central aim point of cross-hair 184 is located at, say X=100, Y=100. In FIG. 7, that same aim point has been moved by a user input command, or series of commands, to be located at, say X=300, Y=300.

It should be realized that any image that can be formed by a digital multi-pixel light projector 154 can be broadcast as a signal 172 for perception by a user. Therefore, perceived size, color, intensity, shape, etc., of an aim point or other data can be controlled by way of user input to the electronics module 152. A user may make adjustments using an operable combination of any of the control mechanism(s) previously disclosed, or as would be readily understood by one of ordinary skill. It is within contemplation that certain changes may be made automatically, based upon a user's modification to a scope parameter. For example, a user's change in scope magnification may automatically change a size of an aim point to compensate for the change in magnification to maintain the user's perceived size of an aim point. Of course, a user may also make such compensating change manually.

Figure 8:
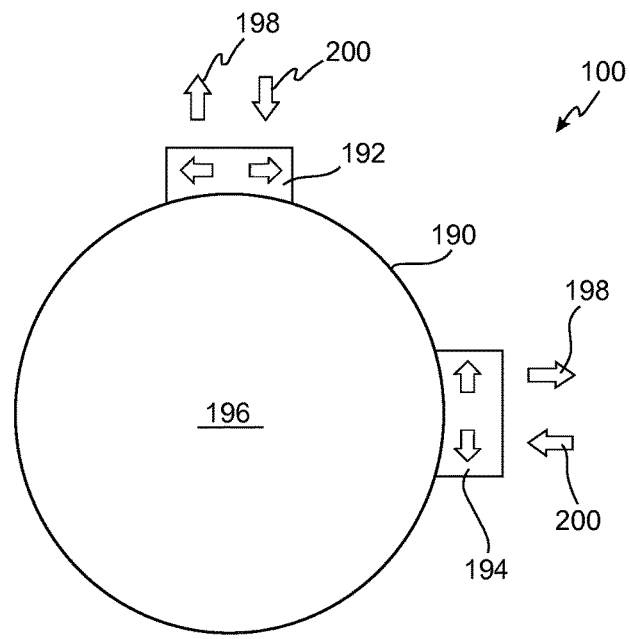
FIG. 8 is a view in elevation looking at a distal end of an embodiment structured according to certain principles of the invention.
Figure 9:
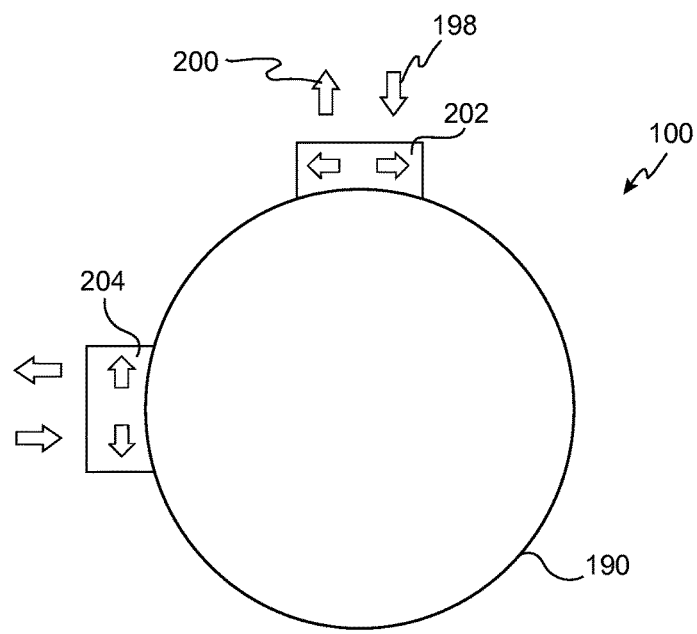
FIG. 9 is a view in elevation of the proximal end of the device in FIG. 8.
Figure 10:
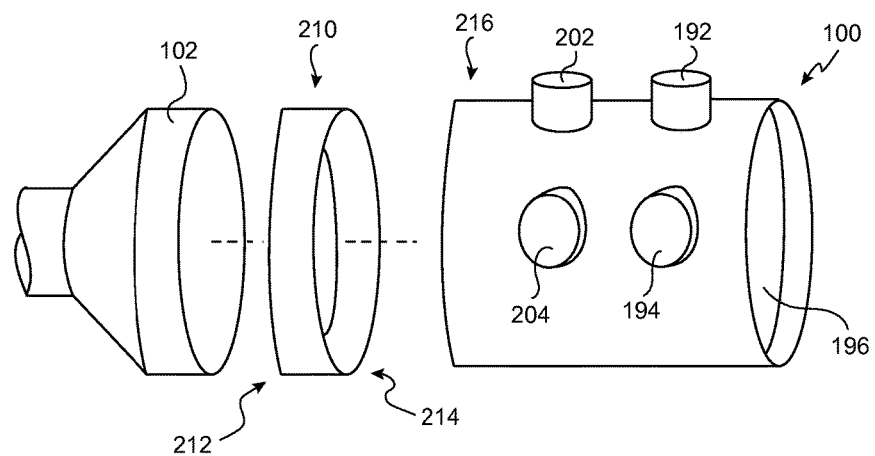
FIG. 10 is a view in perspective of the device in FIG. 8, in combination with a scope.

A second embodiment, generally 100, structured according to certain principles of the invention is illustrated in FIGS. 8 through 10. A housing 190 carries a brightness control knob 192 and a size control knob 194. A lens 196 is disposed at, or near, a distal end of housing 190. Knobs 192 and 194 can be incrementally pulled-out, as indicated by arrows 198, or incrementally pushed-in, as indicated by arrows 200. Each increment of knob travel can index the focus of the control system onto a different aim point or other element of display data. Rotation of a knob 192, 194 can then modify one or more parameter of the aim point or data that is currently under focus. As one example, rotation may be imparted in either direction to increase and decrease a size or brightness (intensity). Similarly, knob 202 is the vertical location adjustment control for aim points, and knob 204 is the horizontal location adjustment control for aim points.

With reference now to FIG. 10, sometimes a coupling device, generally 210 is provided to connect a device 100 to an end of a conventional scope 102. It is within contemplation that proximal end 212 of device 210 may be structured to reliably connect to the scope 102. For example, an adhesive may be applied to a slip-fit to permanently bond the adapter 210 to one end of a conventional scope 102. The distal end 214 of coupler 210 may then be structured to removably couple with proximal end 216 of the device 100 in a repeatable and secure association with the scope 102. It is within contemplation that the coupling effected at either end 212 or 214 may be permanent, or removable.

Figure 11:
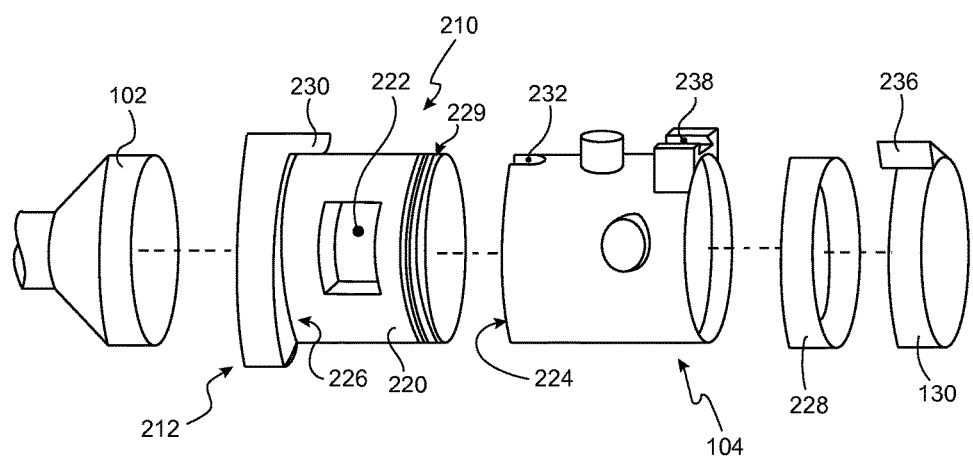
FIG. 11 is a perspective view similar to FIG. 10, of an alternative embodiment.

Another embodiment of a coupling device 210 is illustrated in FIG. 11. The proximal end 212 may be permanently affixed to an end of a scope 102. The body 220 is structured as a mandrel onto which the device 104 slides to accomplish a lock-up installation for repeatable and precise orientation with respect to the scope 102. One or more window 222 permits passage of an auxiliary light signal to augment the conventional view of a user. Upon installation, a proximal end 224 of device 104 can fit against a shoulder 226 for accurate axial location of device 104 with respect to the scope 102. A locking ring 228 engages with threads 229 and serves to maintain the axial assembly position. Circumferential indexing can be accomplished by a protrusion 230 that is received in a cooperating detent 232. A scope cover 130 can be assembled to the device 104 by way of a dovetail 236 received in a cooperating slot 238. Again, the scope cover 130 may carry a beam splitter, or other optical element.

Figure 14:
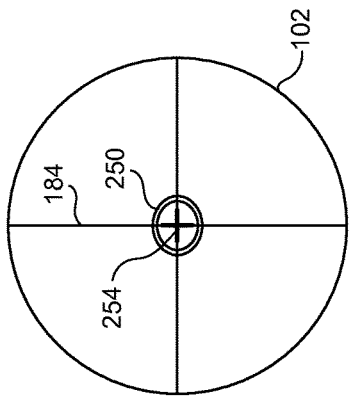
FIGS. 12 through 17 are exemplary views that may be presented to a user who is looking along an optical axis of the device.
Figure 13:
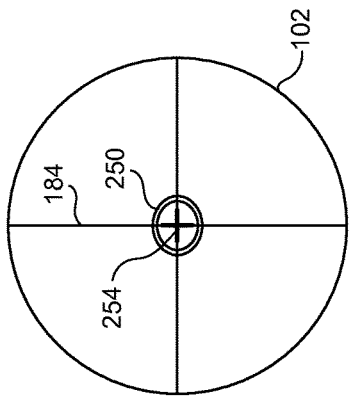
Figure 12:
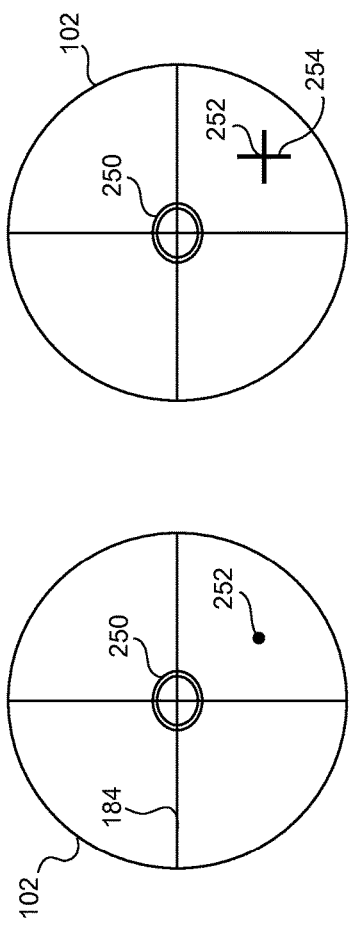

One exemplary process for sighting in a firearm at a first distance using an embodiment of the instant invention is illustrated in FIGs. 12 through 14, and is described as follows: Step 1; aim through a scope 102 at bullseye 250, and shoot the firearm. Step 2; attach a device 104 to the scope 102. (Steps 1 and 2 can be done in any order). Note that, as an example, the bullet hole 252 corresponding to the shot taken in step 1 hit down and to the right in FIG. 12. Step 3; place the scope cross-hairs 184 on the bullseye 250 that was originally aimed for, and hold the firearm steady (e.g. in a gun vice). Step 4; adjust aim point 254 with respect to the bullet hole 252 so that a first aim point 254 is superimposed on the bullet hole 252 (see FIG. 13). The scope cross hairs 184 should be on the bullseye and your first aim point 254 should be on the spot 252 where the first shot hit the target. Step 5; align the rifle cross hairs 184 with the aim point 254 and the firearm is now sighted-in (see FIG. 14). An additional shot can be made to confirm the firearm is zeroed in. The bullet should hit the bullseye 250.

Figure 15:
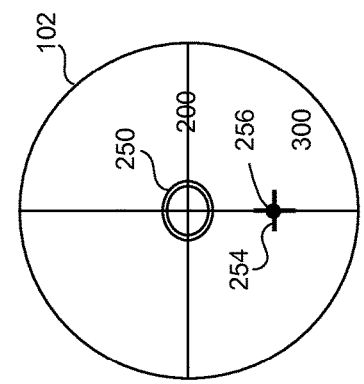

Additional aim points may be located as desired to indicate points-of-impact, at a plurality of distances, to a user. Aim points may be displayed to a user individually, or as a group. Assuming the first aim point 254 (and cross-hairs 184) was sighted-in at 200 yards, an exemplary way to arrange additional aim points is as follows: Step 1; aim the cross-hairs 184 at a more distant target (e.g. 300 yards), and fire a shot. With reference to FIG. 15, it is seen that the corresponding bullet hole 256 landed low, as expected. Step 2; place the scope cross-hairs 184 on the 300 yard bullseye 250, and hold the firearm steady (e.g. in a gun vice). Step 3; adjust first aim point 254 with respect to the bullet hole 256 so that first aim point 254 is superimposed on the bullet hole 256 (see FIG. 15). The firearm is now sighted-in at 200 yards (scope cross-hairs 184), and 300 yards (first aim point 254). Still with reference to FIG. 15, the device 100 may associate a numerical indicator to indicate a distance at which a given aim point has been sighted-in.

Figure 16:
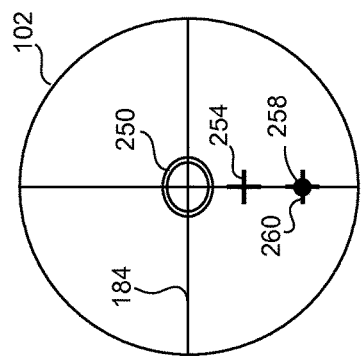

This procedure can be repeated at subsequent distances, as desired. For example, FIG. 16 illustrates the bullet hole 258 of a shot taken with cross-hairs 184 centered on the bullseye 250 of a 400 yard target. The firearm is again held steady with the cross-hairs centered on bullseye 250, and a second aim point 260 is moved into place by user commands to align with bullet hole 258, and the firearm is now sighted-in at 200, 300, and 400 yards.

Figure 17:
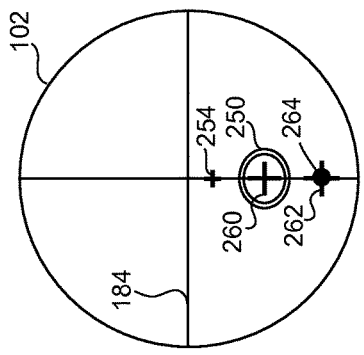

The distance a bullet may drop from 200 yards to 500 yards is considerable. If the firearm operator does not have a large enough target to be able to place the crosshairs 184 (sighted in at 200 yards in previous examples) on the 500 yard target bullseye 250 and still be able to record where the bullet hits the target, then a modification in the process can be used. In this case, the aim point marking the target closest in distance to the bullseye 250 that is now being sighted-in can be placed on the bullseye 250. For this example, the 400 yard aim point 258 can be placed on the bullseye 250 of a 500 yard target (FIG. 17). The firearm operator would then fire a shot and, using the above procedure, align a third corresponding auxiliary aim point 262 with the 500 yard bullet hole 264. The firearm is then sighted-in at 200, 300, 400, and 500 yards.

While the invention has been described in particular with reference to certain illustrated embodiments, such is not intended to limit the scope of the invention. The present invention may be embodied in other specific forms without departing from its spirit or essential characteristics. The described embodiments are to be considered as illustrative and not restrictive. The scope of the invention is, therefore, indicated by the appended claims rather than by the foregoing description. All changes which come within the meaning and range of equivalency of the claims are to be embraced within their scope.

What is claimed is:

1. An auxiliary target indicator, comprising:
    a housing structured to couple directly with either the proximal end, or the distal end, of a substantially conventional firearm scope whereby to place a first optical axis of said housing in parallel with the optical axis of said scope upon assembly of said target indicator and said scope, and wherein the proximal end is defined as the end of the scope that is opposite to the distal end, and the distal end is defined as the light-gathering end of the scope, the proximal end being spaced apart along the scope optical axis from the distal end;
    a light projector associated with said housing;
    a battery in operable electrical communication with light projector;
    an optical system structured to cause propagation of light from said light projector in a direction substantially in agreement with said first optical axis and thereby to present a first aim point to the eye of a user, the first aim point to supplement an aim point provided by the scope; and
    a user-operable control system effective to adjust the position said first aim point in vertical and horizontal directions within the field of view of said user when said user is looking through said scope.

2. The auxiliary target indicator according to claim 1, wherein:
    said target indicator is structured to provide a plurality of aim points to said eye, each of said plurality of aim points being separately adjustable to indicate one of a plurality of impact points, each of such impact points corresponding to a projectile landing at a known distance.

3. The auxiliary target indicator according to claim 1, wherein:
    said optical system comprises a prism.

4. The auxiliary target indicator according to claim 1, wherein:
said optical system comprises a focusing lens.

5. The auxiliary target indicator according to claim 1, wherein:
said optical system comprises a light filtering element.

6. The auxiliary target indicator according to claim 1, wherein:
said optical system comprises a beam splitter carried at a distal end of said housing and disposed in a plane having its normal oriented parallel to said first optical axis of said housing.

7. The auxiliary target indicator according to claim 1, wherein:
said light projector comprises a digital multi-pixel device.

8. The auxiliary target indicator according to claim 1, wherein:
said target indicator is structured to permit a user to adjust said aim point in intensity.

9. The auxiliary target indicator according to claim 1, wherein:
said target indicator is structured to permit a user to adjust said aim point in size.

10. The auxiliary target indicator according to claim 1, wherein:
said target indicator is structured to permit a user to adjust a color of said aim point.

11. The auxiliary target indicator according to claim 1, wherein:
said target indicator is structured to permit a user to adjust a shape associated with said aim point.

12. An apparatus, comprising:
a housing structured to convey a target image along a housing optical axis to the eye of a user;
a first lens disposed at a distal end of said housing;
a second lens disposed at a proximal end of said housing;
a plurality of aim points disposable for view by a user, each of said aim points being individually and separately user-adjustable in user-perceived vertical and horizontal directions, each of said aim points being attributable to a point-of-impact for a projectile at a designated distance from the apparatus; and
a light projector associated with said housing; wherein:
a first one of said aim points is generated by said light projector, wherein a first aim point to supplement an aim point provided by the scope; and
the housing is structured to couple directly with either the proximal end, or the distal end, of a substantially conventional firearm scope having a scope optical axis whereby to place said housing optical axis in parallel with said scope optical axis upon assembly of said housing and said scope, and wherein the proximal end is defined as the end of the scope that is opposite to the distal end, and the distal end is defined as the light-gathering end of the scope, the proximal end being spaced apart along the scope optical axis from the distal end.

13. The apparatus according to claim 12, wherein:
a second one of said aim points is defined by a light-blocking element.

14. The apparatus according to claim 12, wherein:
said light projector comprises a multi-pixel screen.

15. The apparatus according to claim 12, further comprising:
a battery disposed in operable electrical communication with an electronics module and with said light projector;
a user-operable control system coupled to said electronic module; and
an optical system structured to redirect a light output of said light projector for propagation in a direction generally in agreement with said optical axis for acquisition of said light output by said eye.

16. The apparatus according to claim 15, wherein:
said user-operable control system is structured to adjust a user-perceived display intensity of said first one of said aim points.

17. The apparatus according to claim 15, wherein:
said user-operable control system is structured to adjust a display color of said first one of said aim points.

18. The apparatus according to claim 15, wherein:
said user-operable control system is structured to adjust a user-perceived display size of said first one of said aim points.

19. The apparatus according to claim 15, wherein:
said electronics module is structured to permit making an adjustment in a user-perceived display shape of said first one of said aim points.

20. An apparatus, comprising:
a housing structured to convey a target image along a housing optical axis to the eye of a user;
a first lens disposed at a distal end of said housing;
a second lens disposed at a proximal end of said housing;
a plurality of aim points disposable for view by a user, each of said aim points being individually and separately user-adjustable in user-perceived vertical and horizontal directions, each of said aim points being attributable to a point-of-impact for a projectile at a designated distance from the apparatus; and
a light projector comprising a multi-pixel screen associated with said housing; wherein: a first one of said aim points is generated by said light projector, wherein a first aim point to supplement an aim point provided by the scope; and
the housing is structured to couple directly with either the proximal end, or the distal end, of a substantially conventional firearm scope having a scope optical axis whereby to place said housing optical axis in parallel with said scope optical axis upon assembly of said housing and said scope, and wherein the proximal end is defined as the end of the scope that is opposite to the distal end, and the distal end is defined as the light-gathering end of the scope, the proximal end being spaced apart along the scope optical axis from the distal end.

21. An auxiliary target indicator, comprising:
a housing providing a socket structured to couple directly with the distal end portion of the objective lens-end of a conventional firearm scope whereby to place a first optical axis of said housing in parallel with the optical axis of said scope upon assembly of said target indicator and said scope;
a light projector associated with said housing;
a battery in operable electrical communication with light projector;
an optical system structured to cause propagation of light from said light projector in a direction substantially in agreement with said first optical axis and through the objective lens to present a first aim point to the eye of a user, the first aim point being in addition to an aim point provided by cross-hairs of said scope; and
a user-operable control system effective to adjust the position said first aim point in vertical and horizontal directions within the field of view of said user when said user is looking through said scope.

\* \* \* \* \*